United States Patent

[11] 3,580,681

| [72] | Inventors | Andre Robert<br>Paris;<br>Claude Bourdon, Montrouge; Jean Luc Le Goer, Paris, all of, France |
|---|---|---|
| [21] | Appl. No. | 763,325 |
| [22] | Filed | Sept. 27, 1968 |
| [45] | Patented | May 25, 1971 |
| [73] | Assignee | Etat Francais representa par le Ministre des Armees, Delegation Ministerielle pour l'Armement<br>Paris, France |
| [32] | Priority | Sept. 28, 1967 |
| [33] | | France |
| [31] | | 122,613 |

[54] APPARATUS FOR AUTOMATICALLY MEASURING THE PROPERTIES OF ELLIPTICALLY POLARIZED LIGHT
6 Claims, 6 Drawing Figs.

[52] U.S. Cl.................................................... 356/114,
250/225, 356/33, 356/118
[51] Int. Cl............................................................ G01n 21/40
[50] Field of Search........................................... 356/114,
115, 116, 118, 119, 33; 350/159, S.L.

[56] References Cited
UNITED STATES PATENTS

| 2,976,764 | 3/1961 | Hyde et al................ | 356/116 |
|---|---|---|---|
| 3,183,763 | 5/1965 | Koester.................... | 356/33 |

FOREIGN PATENTS

| 1,383,071 | 1964 | France.................... | 356/33 |
| 1,479,298 | 1967 | France.................... | 356/116 |
| 151,065 | 1962 | U.S.S.R................... | 356/116 |

*Primary Examiner*—Ronald L. Wibert
*Assistant Examiner*—J. Rothenberg
*Attorney*—Kurt Kelman

ABSTRACT: An apparatus for measuring the output of a photomultiplier tube energized by the output of a rotating analyzer which is in the path of a polarized light beam. The AC component of the output signal is compared to a reference signal whose frequency corresponds to twice the rotation rate of the analyzer and the phase difference between the two signals provides the spatial orientation of the polarized light. The amplitude of the AC component is proportional to the phase retardation of the polarized beam components. The DC component of the photomultiplier output is used to control the gain of the photomultiplier.

APPARATUS FOR AUTOMATICALLY MEASURING THE PROPERTIES OF ELLIPTICALLY POLARIZED LIGHT

The present invention relates to apparatus and processes for automatically measuring the properties of polarized light, and more particularly for automatically and accurately measuring the orientation of the axes of elliptically polarized light, the ellipticity of the elliptical polarized beams, and the sense or direction of the elliptic polarization.

This invention is useful in all devices requiring the measurement of elliptically polarized light such as polarimetry, polarized microscopes, and particularly in two and three dimensional photoelasticity. In photoelasticity measurements, it has been shown that an isotropic medium, when stressed, becomes anisotropic exhibiting a birefringent effect upon incident light. The stressed specimen contains a fast and slow axis and in addition to producing a phase retardation between the incident component beams, also introduces a velocity difference and a path change. The emerging polarized light will have a resultant vector which revolves about the axis while the length changes during such revolution. The tip of this vector generally traces an elliptical path, and the resultant beam is termed "elliptically polarized." The modifications introduced into the light as it passes through the medium, vary in direct proportion to the elastic stress imposed upon the medium and thus provides a convenient means for analyzing stress concentrations in given specimens of the medium.

In order, to properly analyze the stress concentration of a specimen, measurement of both the orientation of the ellipse and the phase retardation between the components is required. The phase retardation is reflected by the ellipticity or "flattening" of the ellipse and provides a simple method of measuring phase retardation. Conventional methods of analyzing elliptically polarized light require first determining the orientation of the axes and then using this information to determine the ellipticity. Each measurement is independent and subsequent to each other, thereby, in effect, requiring two measurements for each test point. Other conventional techniques use the process of "Tardy and Friedel" or the so called "Babinet compensator," which is placed in the output of the analyzer and introduces a calibrated phase adjustment which will exactly cancel the phase retardation effect produced by the stressed specimen. This device precludes rapid measurements of successive points, is difficult to implement and control, and has limited precision. Measurements made using the prior art techniques are all based on an analysis of the interference fringes in the output, light which in itself is limited in precision since the number of fringes which can be analyzed with certainty is a relatively small number.

It is therefore an object of the present invention to provide an apparatus and process permitting the automatic determination of the parameter of elliptically polarized light, including the ellipticity, the orientation and the sense.

It is another object of this invention to provide an automatic polarization analyzer making measurements of the energy of the resultant light.

It is also an object of the invention to provide means for automatically recording the results of the measurements.

It is still another object to provide an apparatus which can determine all the properties of elliptically polarized light in a single measurement.

It is a further object to provide a process and apparatus for measuring the properties of elliptically polarized light to a precision of 1/5000 of a fringe, which precision is almost two magnitudes greater than using conventional processes.

According to the present invention, the process comprises the following stages:

1. Directing a monochromatic light ray through a specimen whose birefringent properties are to be studied.

2. Analyzing the light emerging from this specimen with a rotating analyzer and a photomultiplier tube.

3. Measuring the output of the photomultiplier tube by an electronic device. The electronic measurement consists of first separating the output of the photomultiplier into a direct current component and an alternating current component. The direct current component, which is a constant value, is used in a feedback circuit to control the gain of the photomultiplier tube. The frequency of the AC component is compared with that of a control signal whose frequency corresponds to twice the speed of rotation of the rotating analyzer. The difference in phase between the AC signal and the control signal is a function of the orientation of the axes of the ellipse. The amplitude of the AC signal characterizes the ellipticity or "flattening" of the ellipse which is a result of the phase retardation introduced by the specimen.

The optical apparatus characterized by the process of this invention comprises a light source, a source of polarized light having a quarter-wave plate in the optical path which plate may be moved and oriented in any desired direction, a rotating analyzer, a photomultiplier and an electronic measuring device which permits automatic measuring of the ellipticity of the polarized light and of the orientation of the axes of the ellipse, while the gain of the photomultiplier is controlled to maintain a constant current output.

The light source may be typically a laser, to provide essentially a circularly polarized monochromatic light which can be easily handled with conventional optical instruments. The inherent coherence of the laser beam is of no essential importance to the functions of this invention.

The polarizer is rotated at a constant speed, so that the luminous flux which arrives at the photomultiplier appears as the sum of two luminous fluxes, by the application of the principles of Malus, one being the DC component and the other the AC component. The voltage at the output of the photomultiplier is measured, to obtain signals proportional to the AC and DC components of the luminous flux.

The electronic apparatus characterized by the process of this invention comprises the photomultiplier and the measuring units. Two output paths are derived from the photomultiplier. On one, the AC component is extracted and this AC component is used first, to obtain a comparison with a control signal whose frequency corresponds to twice the speed of the rotating analyzer, and secondly, to determine its rectified amplitude. The control signal may be provided by an internal generator whose output signal is in fixed relationship to the position of the rotating analyzer. The DC output on the second path is compared to a fixed reference voltage. The difference between the DC output and the fixed reference voltage is amplified and fed back to the control generator which supplies the voltage for powering the photomultiplier. This feedback circuit provides for a constant output current from the photomultiplier.

The amplitude of the signal is used to determine the ellipticity of the axes of the polarized light by either of two methods. The amplitude can be fed to a ratiometer together with the DC output. Alternatively, the AC amplitude can be read directly by first calibrating the apparatus to determine the proportionality between the rectified AC amplitude and the ellipticity, of the polarized light.

These objects, features and advantages of the invention, together with others, will appear from the following detailed description, taken in conjunction with the accompanying drawing wherein.

Figure 2:
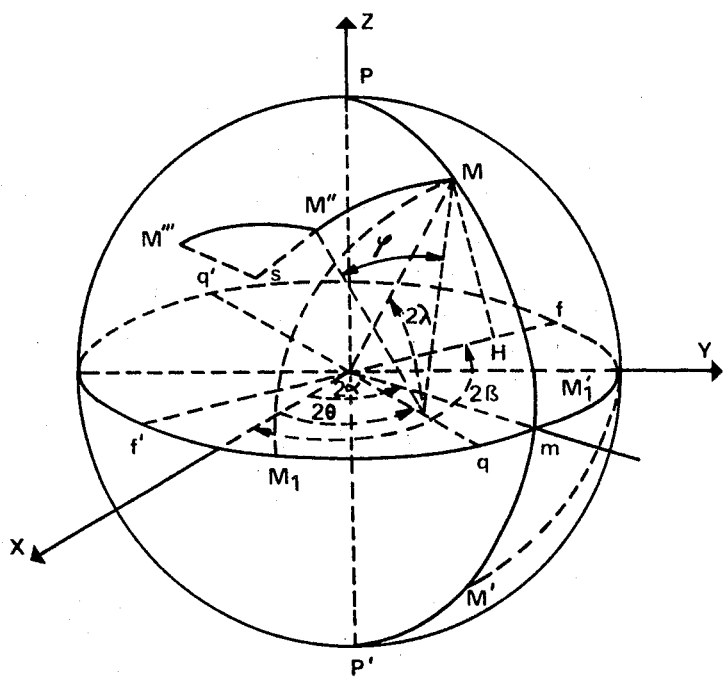
FIG. 2 represents Poincare's Sphere with specific rotations which will be defined hereinbelow.

Referring to FIG. 2, a theoretical description relating to Poincare's Sphere will be described to better understand the subject matter of this invention.

By definition, the radius of Poincare's Sphere is unity. The center is at a point O and three mutually perpendicular axes, $Ox$, $Oy$, $Oz$ are shown. The $Oz$ axis intersects the sphere at points P and P' whose numerical equivalents are +1 and −1, respectively. The equatorial plane is defined by the plane containing $Ox$ and $Oy$. In using Poincare's Sphere, all angles are used double their real values, as is known conventionally.

This sphere will now be used to show geometrically a vector representing elliptically polarized light and the effect upon it of a birefringent medium. The axis $Oz$ represents the direction of propagation of the light.

The sense or direction of elliptically polarized light can be considered right or left polarized, depending upon whether the electric vector turns in a direct or an inverse direction in the plane of polarization. It is understood that the plane of polarization is perpendicular to the direction of propagation $Oz$.

To represent an elliptically polarized light using this sphere, a point M is assumed on the surface of the sphere. The vector $\overrightarrow{Om}$ represents the resultant vector of the ellipse. The elliptically polarized light is assumed to have an orientation of $\alpha$ degrees from the $Ox$ axis and an ellipticity $T = b/a = \tan \lambda$. In representing these values on the sphere, an angle of $2\alpha$ is constructed in the equatorial plane from the reference axis $Ox$. This is shown to be vector $\overrightarrow{Om}$. Thus, the angle between vector $\overrightarrow{Ox}$ and vector $\overrightarrow{Om}$ is $2\alpha$.

The vector $\overrightarrow{Om}$ is then rotated along the sphere an angle of $2\lambda$ to the point M on the meridian $PmP'$. The angle $<moM$ is thus $2\lambda$. As stated above, $\tan \lambda$ represents the ellipticity or "flattening" of the ellipse and is represented by the ratio of minor ellipse axis to major ellipse axis, or $\tan \lambda = b/a = T \leq 1$ (1)

All points in the upper hemisphere are considered representing positively sensed polarization or right vibration. Those in the lower hemisphere, represent negatively sensed polarization or a left vibration.

Referring to the point M, it is noted that a line around the sphere passing through point M and parallel to the equatorial plane would represent resultant vector tip points of ellipses having the same degree of ellipticity. This can readily be seen since all vectors connecting the points of this parallel to the O point would make an angle of $2\lambda$ with the equatorial plane.

Similarly, it is noted that keeping the angle $2\alpha$ constant, but permitting the values of $\alpha$ to change traces a path along the meridian $PMP'$. The meridian $PMP'$ thus represents all the ellipses having an orientation $\alpha$ with the $Ox$ reference axis. It will be understood that as the points go below the equatorial surface, the sense or direction of the ellipse becomes reversed. The equator itself (point $m$ represents rectilinear vibrations since $\lambda = 0$, and $\tan \lambda = 0$, then $b = 0$ from equation (1) and there is then only one component in the $a$ direction, thereby reducing the ellipse to a straight line. The poles P and P' represent respectively circular right and left vibration. At the poles $2\lambda = 90°$, $\lambda = 45°$, $\tan 45° = 1$, and from equation (1) $b = a$. When both components are equal, the ellipse reduces to a circle.

Thus parallels on the sphere represents ellipses of constant ellipticity and varying orientations. Meridians on the sphere represent polarization of constant orientations and varying amounts of ellipticity.

The effect of a birefringent medium will be shown geometrically on the sphere. Assume a birefringent medium having a fast and slow axis and providing a phase retardation of $\Phi$. Assume further, that the light represented by point M is incident upon the medium: a line $qq'$ is constructed in the equatorial plane such that the angle $<xoq$ represents double the angle between the $Ox$ reference axis and the fast axis, and the angle $<xoq'$ represents double the angle between the reference $ox$ axis and the slow axis. This is effectively drawing the line $qq'$ at its orientation about the $Ox$ axis. Since the fast and slow axis in a medium are perpendicular to each other, on the sphere, where the angles are doubled, they are 180° apart and appear as the straight line $qq'$. The effect of the birefringent medium is to rotate the vector $\overrightarrow{OM}$ about the $qq'$ axis an angle of $\Phi$ degrees in the positive or right sense. The light emerging from the birefringent medium would now appear as point $M''$.

The effect of a simple rotary power of value R would be represented on the sphere by a rotation of an angle 2R about the $Oz$ axis in the positive or negative sense depending on whether the rotary power produces right or left rotation. A rotary power does not modify the ellipticity or the sense of the ellipse although it does change the orientation.

The effect of a linear filter will now be shown on the sphere. Assume a linear filter whose axis of transmission is oriented by an angle $\beta$ to the reference axis $Ox$. In the equatorial plane of the sphere the points $f$ and $f'$ are so placed that the angle between $Ox$ and $Of$ is $2\beta$ and the angle between $\overrightarrow{Ox}$ and $\overrightarrow{Of'}$ of $2\beta + \pi$. A polarized light ray represented by M having an initial energy of $E_0$ and passing through the above filter would have an energy $E$ represented by $$E = TE_0 \times fH/ff' \quad (2)$$

where $H$ is the base of the orthogonal projection of M on $f'f$ and $T$ is the transmission factor of the filter.

A set of birefringent will now be shown on the sphere. The effect of each birefringent element individually is similar to that described with respect to the movement from M to $M''$; such that, a second birefringent would then move the point $M''$ to $M'''$. The set of birefringent produces successive rotations about their individual primary axes. The succession of rotations is not commutative but rather cumulative, in that the first encountered birefringent medium must act first. It can be seen that the total effect of the set of birefringent elements is to rotate the initial point M to point $M'''$ through point $M''$. A similar effect could have been produced by having a single birefringent element rotate the point M to point S, followed by a single rotary motion about the $Oz$ axis to point $M'''$, as shown $SM'''$. The principle is therefore established that a set of birefringent element is equivalent to a single birefringent element followed by an element having light rotating power. As explained heretofore, the effect of the rotary power is to change the orientation only. It does not affect the ellipticity. The effect of a birefringent element is to change both the orientation and the ellipticity. Therefore, even with a series of birefringent elements, the total effect of the set can be determined by measuring the orientation and the ellipticity of the resultant polarized light. Thus, each point on the sphere can individually be represented and identified by the three values, $T$, (the amount of ellipticity), the orientation of the axes, and the sense or direction. It will now be seen that these values can be determined by simple energy measurements with automatic recording of the parameters.

Figure 1:
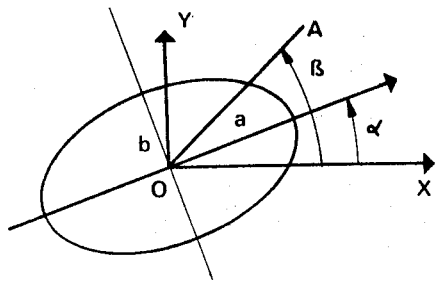
FIG. 1 represents the plane of polarization of elliptically polarized light with half major axis $a$ and half minor axis $b$ whose major axis forms an angle $\alpha$ with respect to the $O_x$ reference axis.

Referring now to FIG. 1, there is shown an ellipticity polarized beam of light whose major axis $a$ forms an angle $\alpha$ with the reference axis OX. The minor elliptic axis is $b$, perpendicular to $a$, and the second reference axis $Oy$ is perpendicular to OX. The luminous energy E transferred by an analyzer whose axis of polarization forms an angle $\beta$ with $Ox$ is given by equation (2). For the particular values given this equation becomes $$E = \frac{a^2 + b^2}{2}[1 + \cos 2\lambda \cos 2(\beta - \alpha)] \quad (3)$$

Using the relationship of equation (1, $T = b/a$, equation (3) becomes $$E = \frac{a^2 + b^2}{2}\left[1 + \frac{1 - T^2}{1 + T^2} \cos 2(\omega t - \alpha)\right] \quad (4)$$

where the analyzer is rotating at a constant speed of $\omega$.

From equation (4) it can be seen that the energy is comprised of two components, $$E_1 = \frac{a^2 + b^2}{2}$$

$$E_2 = \frac{a^2 + b^2}{2} \cdot \frac{1 - T^2}{1 + T^2} \cos 2(\omega t - \alpha)$$

$E_1$ is a constant value since $a$ and $b$ are constants, and it represents a DC component; $E_2$ is an alternating component.

A photomultiplier placed at the output of the analyzer detects the energy of equation (4). From the alternating current value $E_2$, both the orientation and the ellipticity can be obtained.

The AC current of $E_2$ is compared with a control signal corresponding in frequency to twice the speed of rotation of the analyzer cos $2\omega t$. Comparing the phase of the two signals gives a function of the value $2\alpha$ which is the double of the orientation of the major axis. The ellipticity of the polarized light is determined from the amplitude of the AC component. The amplitude of the rectified AC component is $$\frac{a^2+b^2}{2} \cdot \frac{1-T^2}{1+T^2}$$

By combining this value with the DC value in a ratiometer, the result is $$\frac{1-T^2}{1+T^2}$$

Since tan $T=b/a'$ this can be reduced to cos $2\lambda$ by trigonometric formulas, from which $2\lambda$ is easily found.

Alternatively, the AC component could be read directly by initially calibrating the instrument such that $a^2+b^2/2$ assumes an initial constant offset value.

As was described in connection with Poincare's Sphere, the vibration is represented by point M or M′ depending on whether it is a right or left sense. To determine the proper direction of polarization, a swiveling quarter-wave plate is placed between the emerging light and the rotating analyzer. The fast axis of the quarter-wave plate is merged with the major axis of the ellipse which has already been determined by the energy measurement. The phase of the AC signal will then show if the vibration is M or M′, right or left sense.

Figure 3:
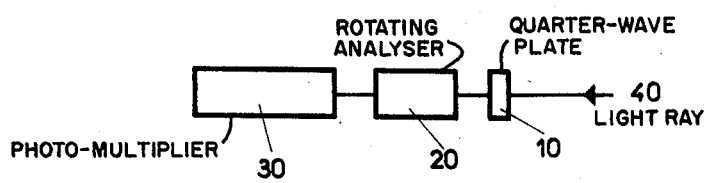
FIG. 3 shows diagrammatically the optical apparatus used in conjunction with this invention.

Referring now to FIG. 3 which is a schematic of the optical device, there is shown successively in the path of the light ray 40, a quarter-wave plate 10, which may be oriented and shifted in any desired direction, a rotating analyzer 20, which rotates at constant speed $\omega$, and a photomultiplier 30.

Figure 4:
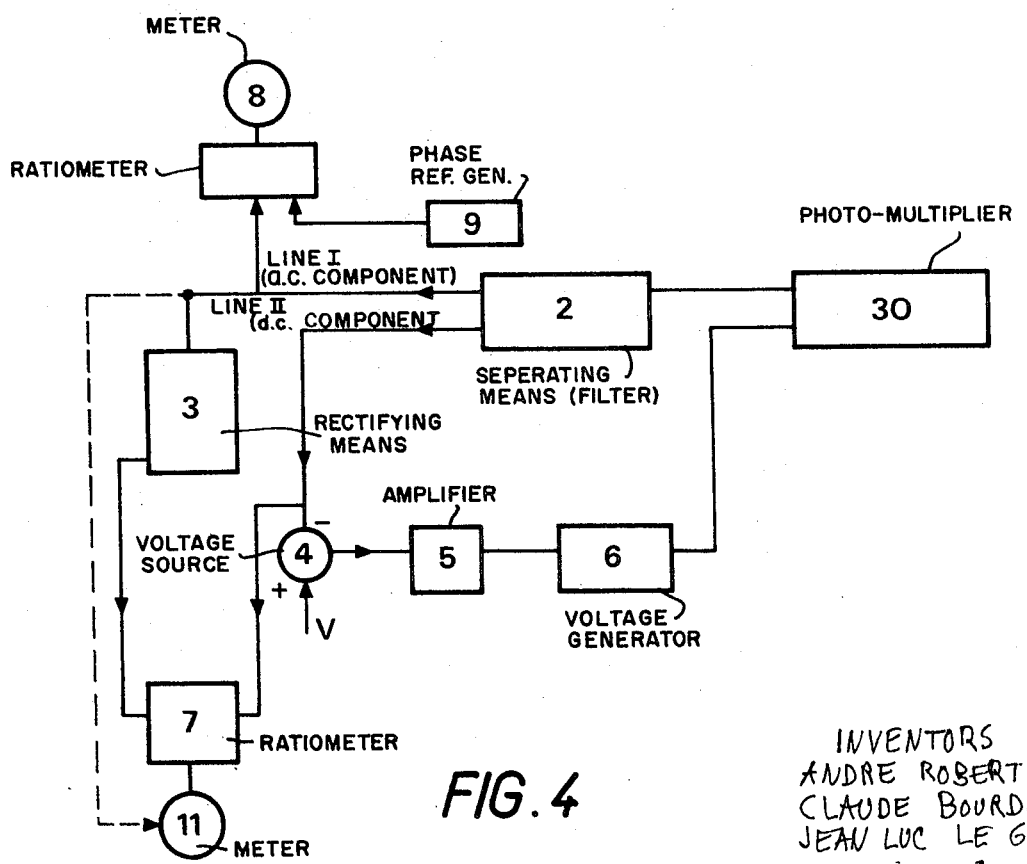
FIG. 4 shows diagrammatically the electronic apparatus used in conjunction with this invention.

Referring to FIG. 4, there is shown by way of example, an electronic device useful in the operation of the present invention. Separating means 2 at the output of photomultiplier 30 may be of any suitable type. For example, the separating means may comprise a bank of filters suitable for separating the direct current component and the alternating current component at a predetermined frequency. At the same time the bank of filters will eliminate all other frequency components which would only be parasitic oscillations or noise emanating from the photomultiplier. Using filters for the separating means also insures that the signal having a frequency equivalent to twice the rotational speed of the analyzer will be very pure. The filter in the separating means producing the DC component on line II must have a definite pass band to assure stability of the control.

Two lines I and II come from the separating means 2. On line I is the AC component of the detected voltage and on line 2, the DC component of this same voltage. The AC component on line I is used for two purposes. First, its phase is compared in comparing device 13, with a signal proportional to cos$2\omega t$ coming from a device 9 delivering a reference signal, thereby determining the orientation of the axes of the ellipse on meter 8. Secondly, it is rectified by rectifying means 3, which may constitute a conventional diode, thereby obtaining a quantity proportional to $1-T^2/1+T^2$, as explained hereinbefore.

The device 9 delivering the reference phase may be a photoelectric cell receiving a polarized light ray coming from a lamp and passing through the rotating analyzer. It will be noted, however, that the position of the polarizer is of no importance as long as it is in the path of the light ray. The only important factor is its direction of polarization. The orientation of the fixed polarizer is adjustable and its position is so chosen as to fix the reference direction in the most advantageous position.

The direct voltage coming from separating means 2 on line II is compared to a fixed voltage V by means of a comparator 4 which has two inputs; the fixed voltage V, and the direct voltage coming from the separating means 2 on line II. The output is a signal equal to the algebraic difference of these two voltages.

This difference voltage is amplified by DC amplifier 5. The output of amplifier 5 is applied to the control of the high voltage generator 6 of photomultiplier 30. The gain of the amplifier 5 is so controlled that the average value of the output current of the photomultiplier will be substantially constant.

To determine the quantity $1-T^2/1T^2$, one may produce the quotient of the rectified AC voltage from rectifier 3 with the average value of the direct voltage from line II of the separating means 2 by means of a measuring apparatus 7 which may typically be a ratiometer. The value of the ellipticity is then read on meter 11. Alternately, one may simple measure the AC voltage on line I, directly by meter 11 (as shown in dotted lines) which has been previously calibrated as hereinbefore described. In this case, the rectifier 3 is not necessary, as well as the conductor which connects line 11 of separating means 2 to the measuring apparatus 7.

It will be noted that the process of this invention may also be used if a nonmonochromatic and nonpolarized light source is used. The only requirement is that the light be constant and the form of light may be varied until it is linearly polarized. This last condition may be satisfied by introducing a quarter-wave plate which can be oriented and shifted in any desired direction and whose fast axis is on the minor axis of the ellipse. In effect, on the sphere of Poincare, the representative point of the form of light is produced after passing through the quarter-wave plate in the equatorial plane of the sphere of Poincare, thus producing a rectilinearly polarized light as the monochromatic light which permits calibration.

It will be noted that this process and device may be applied to both two-dimensional as well as three-dimensional photoelasticity. Every transparent body which in fact acts on the incident light has its operation dependent on the factors directly tied to the accidental birefringence. This device can automatically measure this birefringence.

THEORY AND DESCRIPTION OF AN AUTOMATIC TWO-DIMENSIONAL PHOTOELASTICIMETER

Figure 5:
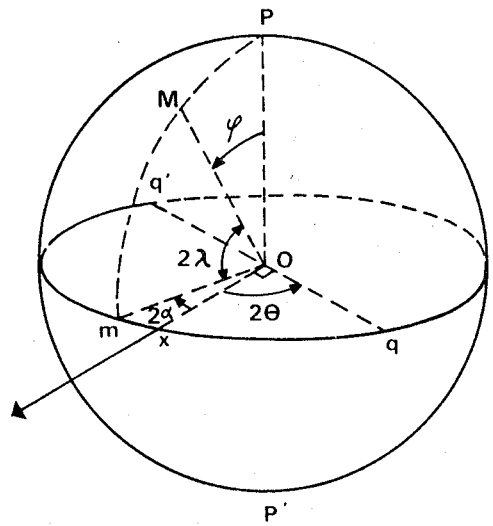
FIG. 5 shows a theoretical principle of two-dimensional photoelasticimetry.

Suppose that a beam of monochromatic light, say, right circularly polarized, be directed to a point on the model. Further, suppose that at this point the difference in phase $\Phi$ is less than $\pi/2$, and that the fast axis forms an angle $\theta$ with the reference direction as it leaves the model. According to Poincare's representation the vibration will be represented by the point M, obtained by rotating P through an angle $\Phi$ about axis $q'q$ (FIG. 5).

By the method previously described for analyzing polarization forms, the value of twice and the angle $\alpha$ between the major axis of the ellipse and the reference direction and the value $2\lambda$ can be obtained automatically; note that cos $2\lambda$ is equal to the sine of the phase-difference, and $2\theta$ equals $2\alpha+\pi/2$.

Figure 6:
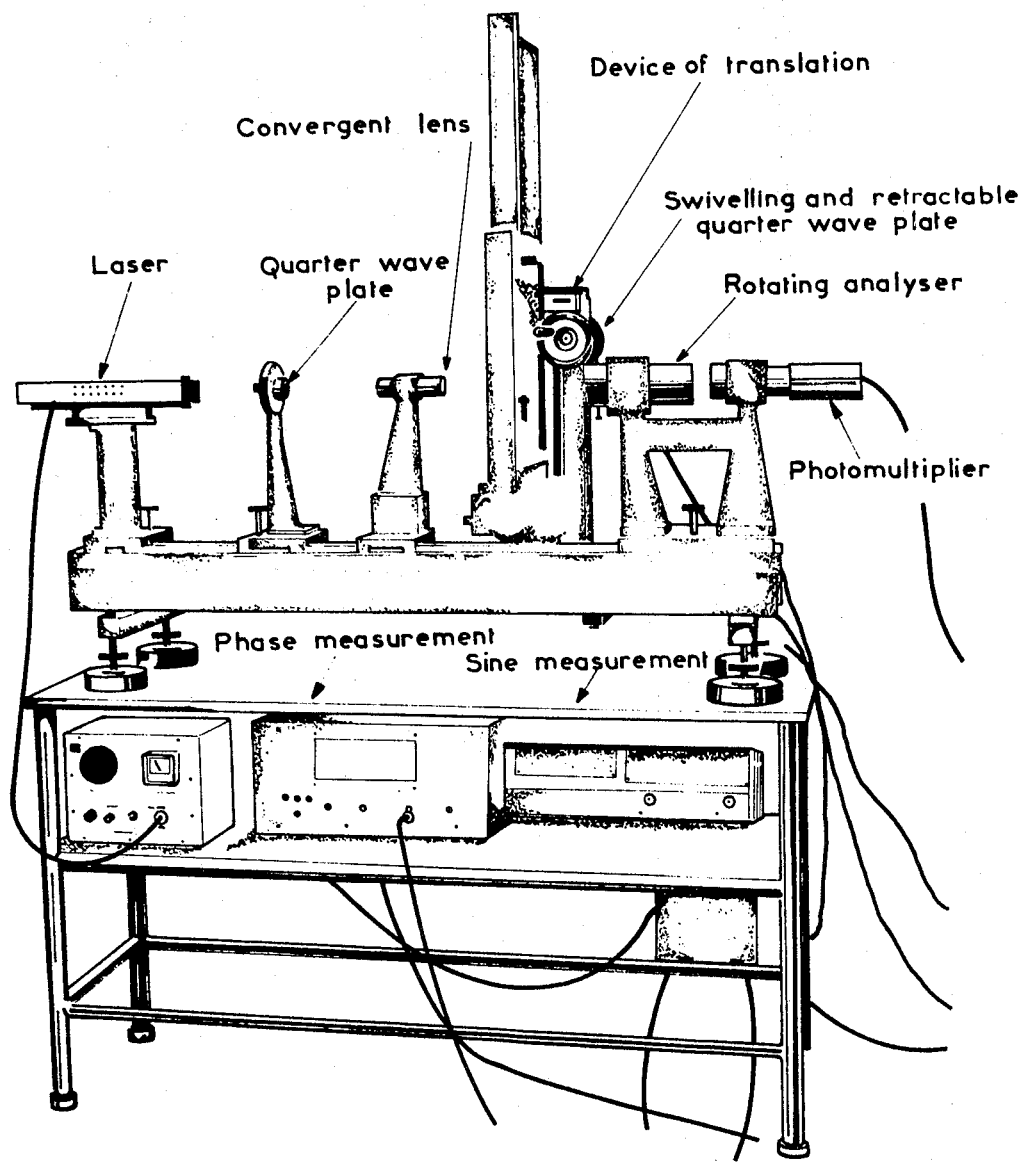
FIG. 6 shows an embodiment of an automatic optical bench for use in two-dimensional photoelasticity.

The prototype of the apparatus is shown in FIG. 6. The light source is a laser; a quarter-wave plate converts this to circularly polarized light and a convergent lens provides a very small spot of light on the model. The model may be moved in two orthogonal directions.

On leaving the model the beam of light passes through the rotating analyzer and then falls upon the photocathode of the photomultiplier. The values of sin $\Phi$ and of $\theta$ are read from the two digital voltmeters.

A swiveling, retractable quarter-wave plate permits, on the one hand, in the absence of the model, the calibration of sin $\Phi$, and, on the other hand, the model being in position, allows determination of whether the vibration is right- or left-handed. It is, however, advantageous to restrict the difference in phase to below $\pi/2$. This leads to the use of materials which are not very photoelastic, such as Plexiglas.

The accuracy of measurement is of the order of a thousandth of a radian for $\Phi$ and about a degree in the orientation of the fast axis.

Depending on the sign of Brewster's constant the algebraically greatest stress is either orthogonal to or coincident with the fast axis.

We claim:

1. An apparatus for automatically determining the properties of an elliptically polarized light beam by means of energy measurements, such properties including the ellipticity of the elliptically polarized beam and the spatial orientation with respect to three fixed, mutually perpendicular coordinate axes, said apparatus comprising a rotating analyzer placed in the path of said polarized light beam, a photomultiplier energized by light passing through said rotating analyzer, and electronic energy detecting means including means for separating the DC and AC components of the photomultiplier output, means for producing a reference signal at twice the frequency of rotating analyzer, means for comparing the phase of said reference signal with said AC component, means for measuring the amplitude of said AC component and feedback means receiving said DC component and stabilizing the average current output of said photomultiplier at a constant value.

2. An apparatus as in claim 1 where said means for separating the DC and AC components comprise a bank of filters.

3. An apparatus as in claim 1 wherein said feedback means includes circuitry supplying a DC reference voltage, means for comparing said DC reference voltage with said DC component, and producing a difference voltage, and means for amplifying said difference voltage and applying it to the control generator of said photomultiplier.

4. A method for determining the properties of an elliptically polarized light beam including the ellipticity of the elliptically polarized beam and the spatial orientation of the major axis of the elliptically polarized by means of a rotating analyzer, a photomultiplier and electronic measuring means said elliptically polarized beam traversing the rotating analyzer to impinge upon said photomultiplier and thereby produce a photomultiplier output current for processing by said measuring means including the steps of:

a. electrically separating the AC and DC components of the photomultiplier output current, b. using the DC component to stabilize the photomultiplier average output current at a constant value, c. measuring the phase difference between the AC component and a reference signal operating at twice the frequency of the rotating analyzer and determining therefrom spatial orientation of said elliptically polarized beam, and d. measuring the amplitude of the AC component and determining therefrom the ellipticity of the elliptically polarized beam.

5. An apparatus as claim 1 further including a quarter-wave plate in the path of said light beam, said plate being mounted for rotational and linear translation with respect to said light beam.

6. An apparatus as in claim 1 wherein said amplitude measuring means comprises means for deriving the RMS value of said AC component; and a ratiometer having a first and a second input and an output, the RMS value of the AC component being connected to said first input, said DC component being connected to said second input, whereby a signal is developed representative of the quantity $1-T^2/1+T^2$ on said output, $T$ being the ellipticity of said beam.